Dec. 8, 1953   W. A. BURNS ET AL   2,662,001
PLATE DESIGN FOR PULSE COLUMNS
Filed June 12, 1951
FIG.1
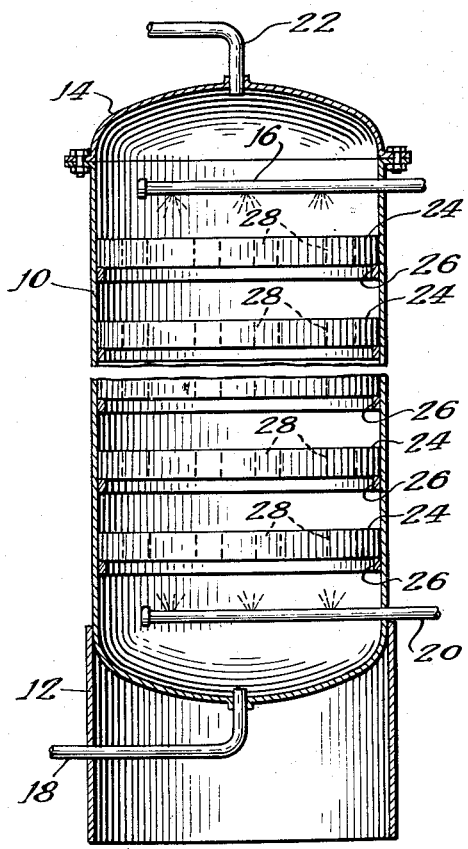
FIG.2
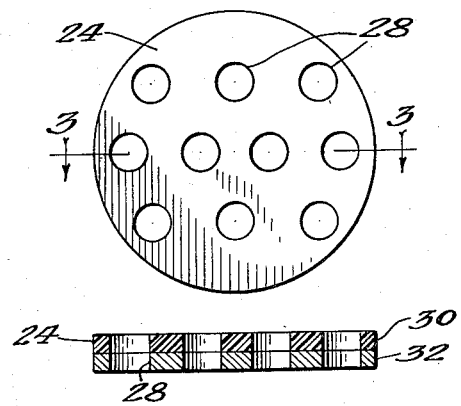
FIG.3
FIG.4
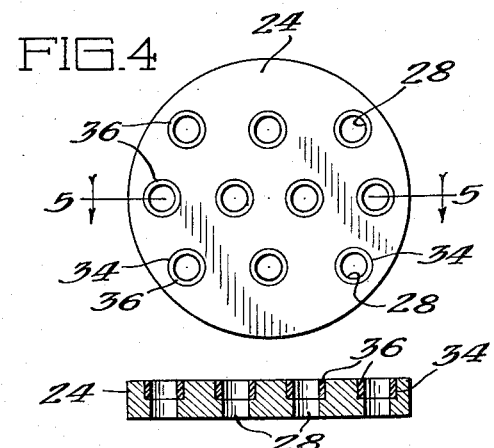
FIG.5
INVENTORS:
William A. Burns
Warren F. Johnson
BY
Roland A. Anderson
Attorney Patented Dec. 8, 1953

2,662,001

UNITED STATES PATENT OFFICE 2,662,001

PLATE DESIGN FOR PULSE COLUMNS

William A. Burns and Warren F. Johnson, Richland, Wash., assignors to the United States of America as represented by the United States Atomic Energy Commission Application June 12, 1951, Serial No. 231,145

4 Claims. (Cl. 23—270.5)

This invention relates to pulse columns and particularly it refers to perforated plates therefor.

A pulse column is a substantially vertical column in which at least two fluids or phases are moved countercurrently to each other. One fluid enters near the bottom and is withdrawn at the top while the other fluid enters near the top and is withdrawn at the bottom. Between the inlets the fluids are thoroughly mixed in order that one fluid may extract a solute from the other. It is preferred that the fluids be immiscible and the lighter fluid enters at the lower inlet while the heavier liquid enters near the top.

Most columns have means for enhancing the mixing. In the instant case stationary plates are disposed horizontally one above the other within the column. The plates are perforated to permit alternate passage of the fluids in opposite directions. In order to facilitate coalescence of each fluid after mixing and prior to passing through the perforations, opposite sides of each plate are composed of different material. The material on the top side is wettable by the heavier fluid and the material on the lower side is wettable by the lighter fluid.

For a more complete understanding of the nature and scope of the invention, reference may be had to the following detailed description taken in connection with the accompanying drawings, in which:

Figure 1 is a vertical sectional view of a pulse column embodying the present invention;

Figure 2 is a plan view of a plate constituting one embodiment of this invention;

Figure 3 is a sectional view of the plate, taken on the line 3—3 of Figure 2;

Figure 4 is a plan view of a plate constituting another embodiment of this invention; and Figure 5 is a sectional view of this second plate, taken on the line 5—5 of Figure 4.

As shown in Figure 1, a cylindrical pulse column 10 is mounted on a base 12. The column 10 is completely enclosed and is provided with a detachable top 14. Near the top of the column 10 is an inlet 16 for a heavy fluid which is preferably provided with spray means for disseminating said fluid into the column. At the bottom of the column 10 is an outlet 18 for the heavy fluid. Near the bottom of the column 10 and above the outlet 18 is an inlet 20 for a light fluid which is similarly provided with spray means. In the top 14 is disposed an outlet 22 for the light fluid. Between the inlets 16 and 20 are disposed a plurality of circular plates 24 which are horizontally disposed in vertical spaced relationship to each other and in a fluid-tight manner with the column 10 on rings 26 secured thereto. Each plate 24 is provided with a plurality of perforations or apertures 28.

The essential feature of each plate 24 is shown in Figures 2 and 3 wherein each plate is composed of a layer 30 of material which is wettable by one fluid and of a layer 32 of another material which is wettable by another fluid. For example, the layer 30 may be composed of fluorothene and the layer 32 may be composed of stainless steel, the former being wettable by organic liquids while the latter is wettable by aqueous liquids.

Another embodiment of the plate 24 may be composed of a solid plate of stainless steel or another material which is wettable by aqueous liquids having similar apertures 28 disposed therethrough and having one side sprayed with polythene, which is wettable by organic liquids.

A third embodiment of the plate 24 is shown in Figures 4 and 5 in which the plate is composed of stainless steel having apertures 28. Each aperture has a counterbore 34 over a portion of its length facing the same side of the plate 24. In each counterbore is disposed a suitable wettable material in the form of a collar 36, the inside diameter of which is equal to the inside diameter of the aperture. As a specific example these collars 36 may be made of fluorothene.

Operation

In accordance with the theory of pulse columns, the purpose of this invention is to assure complete dispersion and coalescence of the counterflowing liquids between a given pair of plates. This is accomplished as follows: The liquid of lesser specific gravity enters the column 10 at the inlet 20 and the liquid of greater specific gravity enters at the inlet 16. The entire column 10 is filled with these liquids including the compartments between the plates 24. Due to flow resistance offered by the plates, the liquids segregate therebetween into a lower layer of heavier liquid and an upper layer of lighter liquid. In order to facilitate movement of the liquids from one compartment to another, a mild pulsing pressure may be applied to liquid inlets 16 and 20 by means not shown, such as a conventional pump. The pulsing pressure may be applied either alternately to both inlets or merely to one inlet. At the same time a suction may be applied to the outlet for the liquid to whose inlet the pulse is applied. The alternating pressures are transmitted throughout the column 10, causing first the heavier liquid to pass through the apertures 26 to a lower compartment and then the lighter liquid to pass through the same apertures to a higher compartment. In this manner are the liquids dispersed into each other.

In order to maintain continual operation, it is advantageous that the liquids separate into their respective layers after dispersion. This is dependent upon several factors including the difference in specific gravities, the size of the liquid droplets, and the immiscibility of the liquids. It is preferred for the purpose of this invention that one liquid be aqueous and that the other be organic, these being immiscible. Further, it arbitrarily is assumed that the organic phase is heavier and that it is a solution in which is dissolved a solute to be extracted by the aqueous liquid. Accordingly, as the organic solution moves into successively lower compartments, it yields the solute to the aqueous liquid moving in the opposite direction. In short, the aqueous liquid extracts the solute from the organic solution in each compartment by dispersion.

After dispersion, the droplets separate by gravity to their respective layers. Manifestly, the finer the dispersed droplets of each liquid the better and the greater the extraction efficiency. However, the finer droplets are slower in their separation into respective layers. Moreover, extremely small droplets will accumulate rather than coalesce into a homogeneous layer, thereby trapping portions of the other liquid and resulting in back-flow. It was found that if the opposite sides of the plate had different wetting characteristics, the drops adjacent each side would coalesce more readily. Thus, a fluorothene layer was attached to a stainless steel plate, whereby the organic liquid coalesced more readily upon contacting the plastic (fluorothene or polythene) surface while the aqueous liquid preferably wet the stainless steel side of the plate. Of course, the apertures of each layer are aligned. The compound plates are installed in the column 10 with the stainless steel side up or down depending upon whether the aqueous liquid has a lower or higher specific gravity than the organic phase. In the foregoing description the organic phase was considered heavier in order to comply with the drawings.

Actual results have substantiated the theory. At flow rates of 900 and 1700 gals./ft.$^2$/hr. the compound plates gave lower waste losses than the normal stainless steel plates. This led to higher pumping capacity with less waste due to stronger and more frequent pumping pressures. Further, under mild pulsing conditions the use of 0.076-inch apertures in compound plates resulted in higher waste losses than were obtained with 0.046-inch apertures. More vigorous pulsing conditions reduced the waste losses for the larger apertures.

Other variations from the preferred methods and examples described will be apparent and may be made without departing from the spirit and scope of the invention. For example, plastic collars around the peripheries of the apertures may be substituted for the plastic layer over the entire surface as shown in Figures 4 and 5.

What is claimed is:

1. An article of manufacture comprising a plate having a plurality of perforations therethrough, the peripheries of the perforations on one side of said plate being surrounded with stainless steel, and the peripheries of the perforations on the other side of said plate being surrounded with fluorothene.

2. A plate for a two-phase extraction column comprising a plate having a plurality of apertures therethrough, said plate comprising two layers of different materials having apertures in alignment, one of said materials being fluorothene and the other of said materials being stainless steel, the diameter of said apertures being 0.076 inch.

3. A plate for a two-phase extraction column comprising a plate having a plurality of apertures therethrough, said plate comprising two layers of different materials having apertures in alignment, one of said materials being fluorothene and the other of said materials being stainless steel, the diameter of said apertures being 0.046 inch.

4. A plate for a two-phase extraction column comprising a plate of stainless steel having a plurality of apertures therethrough, each aperture having a counterbore over a portion of the length thereof facing the same side of the plate, and a fluorothene collar within the counterbore, the diameter of the apertures being equal to the inner diameter of the collar.

WILLIAM A. BURNS.
WARREN F. JOHNSON.

References Cited in the file of this patent

UNITED STATES PATENTS

| Number | Name | Date |
|---|---|---|
| 1,320,396 | Laird | Nov. 4, 1919 |
| 2,215,359 | Livingston et al. | Sept. 17, 1940 |